June 20, 1967 G. PIECHA ETAL 3,326,585
DEVICE FOR CLAMPING TOGETHER TWO MEMBERS
Filed Oct. 29, 1964
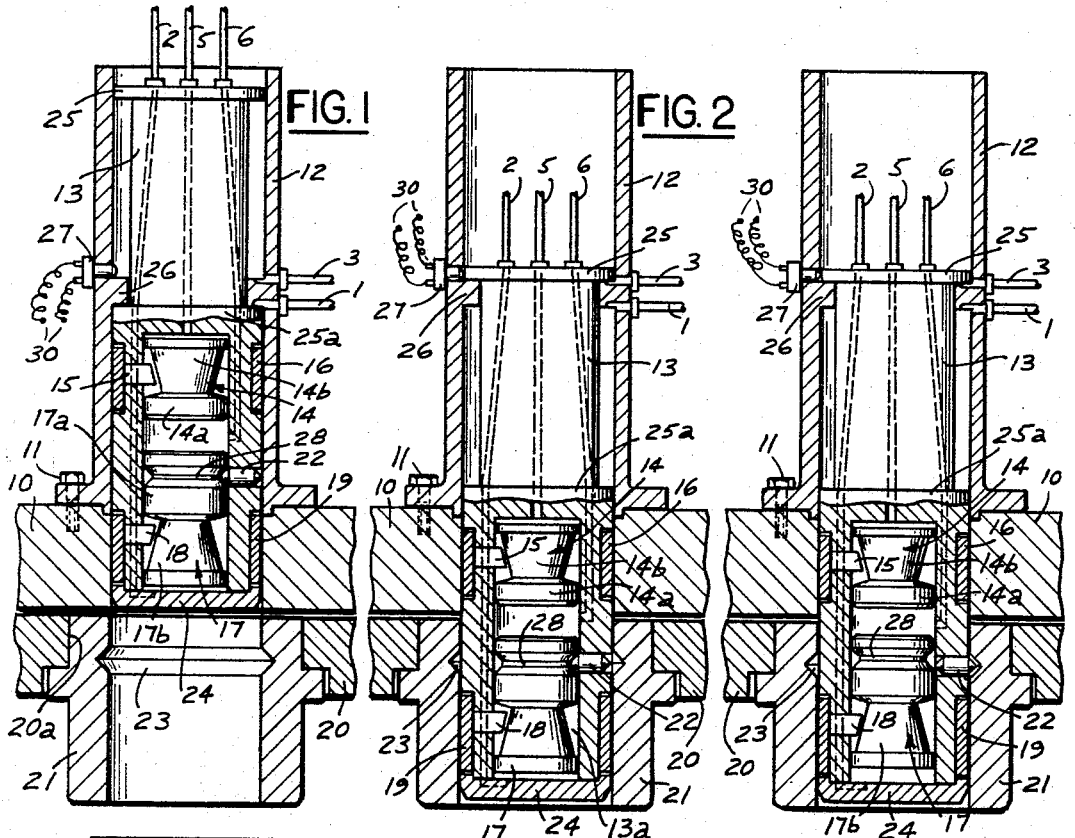
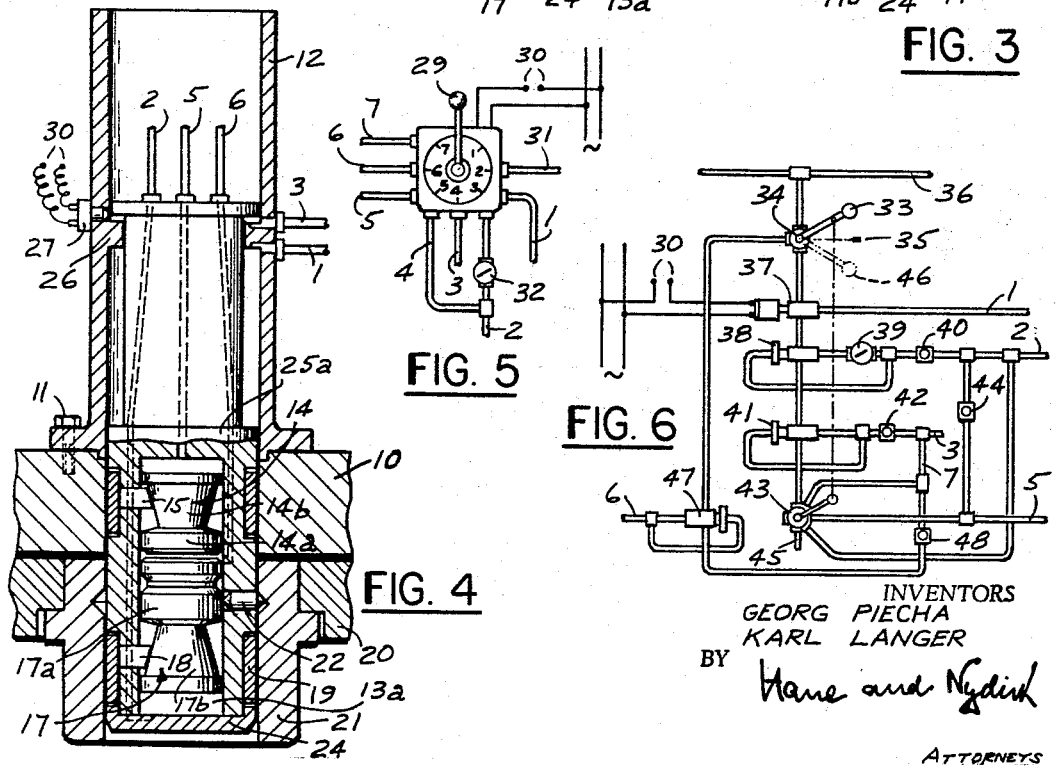
INVENTORS
GEORG PIECHA
KARL LANGER
BY Hane and Nydick
ATTORNEYS

# United States Patent Office 3,326,585
Patented June 20, 1967

3,326,585
DEVICE FOR CLAMPING TOGETHER TWO MEMBERS
Georg Piecha, Offenbach am Main, and Karl Langer, Heusenstamm, near Offenbach am Main, Germany, assignors to Roland Offsetmaschinenfabrik Faber & Schleicher A.G., Offenbach am Main, Germany, a German company
Filed Oct. 29, 1964, Ser. No. 407,310
Claims priority, application Germany, Apr. 9, 1964, R 37,657
11 Claims. (Cl. 287—189.36)

The invention relates to a device for releasably clamping together two relatively movable members in predetermined positions in reference to each other and holding said members in pressure engagement with each other and, more particularly, to a device for releasably securing a subassembly of a printing press to a wall of the frame structure of the press by means of a peg or lug which is mounted lengthwise displaceable in an opening in one part of the press such as the frame structure and is engageable with a corresponding locking opening in another part of the press such as a wall of the subassembly.

As it is evident, a certain amount of play must always be provided between a rotary shaft and a bearing in which the shaft rotates. Accordingly, the lug or peg may become slightly twisted or canted in reference to its guiding surfaces in one part or in the other, or even in reference to the guiding surfaces in both parts of the press. As a result the two openings in which the peg is moving may be slightly misaligned.

It is a broad object of the invention to provide a novel and improved clamping device of the general kind above referred to by means of which the axes of the coacting openings in the two members to be positioned and clamped as above described can be accurately aligned and all operations involved in the positioning and clamping of the two members and the release thereof can be carried out from a single location.

A clamping device according to the invention comprises at least one pin or similar element which is slidably supported on the peg or lug which, in turn, is lengthwise slidable in guide surfaces on one of the members to be clamped together. The pin is movable in a direction substantially normal to the axis of the peg or lug between a position within the peripheral outline of the peg and a position protruding therefrom. When the peg is fully inserted into the opening of the other one of the two members, the pin can be urged by suitable activating means into its protruding position and engages in this position a recess in said other member. As a result, the peg and the other member are coupled together. When now the peg is slightly retracted from the opening in said other member the two members are pressed against each other. While it is sometimes advantageous to provide several such pins in circumferentially spaced relationship, in many instances a single pin is sufficient for the purpose.

A more specific object of the invention is to provide a novel and improved clamping device of the general kind above referred to in which rugged and simple clamping means produce a powerful and effective clamping action between the peg or lug and the two members whereby the aforementioned combined positioning and clamping of the two members is obtained.

The clamping means may comprise one or several bolts which are supported by the peg or lug and are slidable in a direction substantially normal to the axis of the peg or lug. The bolts are outwardly movable by means of conical elements lengthwise slidable in an axial recess of the peg and exert in an outward position a clamping pressure clamping the peg against a wall portion of the respective member, preferably by means of an interposed guide sleeve.

Another more specific object of the invention is to provide a novel and improved clamping device of the general kind above referred to in which actuating means for actuating the pin or pins to effect pressing of the two members together and actuating means for actuating the bolts to effect clamping the peg or lug against the two members are combined in a common control member axially displaceable in the aforementioned recess of the peg or lug.

While conventional mechanical means such as threaded spindles may be used to operate the actuating means for the aforedescribed pressure and clamping actions, it is an object of the invention to effect said operations by hydraulically or air pressure-operated means which act upon said common control member to cause displacement of the same. Such fluid pressure-operated means permit a rapid and simple control action.

According to another specific object of the invention, the fluid pressure-operated means are also used to displace the peg or lug as such by providing a peg or lug in the form of a plunger which is slidably guided in a cylinder secured to one of said members.

It is also an object of the invention to provide for the control of the clamping device a manually operable multi-position valve means which when moved through all its positions initiates sequentially the displacement of the peg or lug mounted on one member into engagement with the other member, the movement of the pin or pins supported on the peg or lug into the position in which the two members are coupled together, the partial withdrawing of the peg or lug to effect pressing of the two members against each other, the activation of the clamping means to effect the clamping operation, the release of the clamping means, the withdrawal of the pin or pins and the withdrawal of the peg or lug from the other member. The use of such sequentially operating valve means has the advantage that mistakes either during the positioning and clamping operation or during release are practically precluded. As a further safety means a blocking device may be provided which permits movement of the coupling pin or pins into the coupling position only when the lug or peg is fully pushed home in the other member.

A more specific object of the invention, allied with the next preceding one, is to provide an automatic cycling device which when operated by an actuating member effects all the aforelisted operational steps in the correct sequential order thereby greatly reducing the time required for locking and releasing respectively the two members.

The invention also encompasses a clamping device in which the coupling pin or pins for coupling the peg and one of the members together are omitted. Such simplified device is particularly suitable for positioning and clamping the peg or lug without play in a direction radial thereto.

Other and further objects, features and advantages of the invention are pointed out hereinafter and set forth in the appended claims constituting part of the application.

In the accompanying drawing several preferred embodiments of the invention are shown by way of illustration and not by way of limitation.

In the drawing:

FIG. 1 is a sectional, elevational view of a clamping device according to the invention mounted on one of the members to be positioned and clamped together, the device being shown in its rest position disengaged from the other member, FIG. 2 is a similar view and showing the device engaged with the other member in the inital stage of the positioning and clamping operation, FIG. 3 is a view similar to FIG. 2 and showing a more advanced stage of the operations, FIG. 4 is a view of the clamping device showing the same in its final position in which the two members are positioned and clamped together, FIG. 5 is a diagrammatic view of a multi-way control valve for manual control of the clamping device, and FIG. 6 is a diagrammatic view of an automatic cycling device for automatic control of the clamping device.

Referring first to FIGS. 1 to 4 in detail, the exemplified clamping device is arranged to position and clamp together members 10 and 20. Member 10 may be visualized as a wall of the frame structure of a printing press and member 20 as a wall portion of a subassembly of the press. Member 20 is assumed to be displaceable parallel to wall 10 by a mechanism not essential for the understanding of the invention and hence not illustrated or described in detail. The two members are shown in FIGS. 1 through 4 in the positions in which they are ready for positioning and clamping.

While the clamping device according to the invention may be mounted directly in an opening of member 10, the device is shown as comprising a cylindrical guide sleeve 12 secured upright on member 10 by suitable fastening means such as screws 11. Member 20 has a receiving or locking opening 20a. While the clamping device may coact directly with the wall portions of member 20 defining locking opening 20a, it is preferable to provide a liner 21 in the locking opening and such liner is shown.

The clamping device further comprises a lug or peg 13 which is slidable in guide sleeve 12. The lower portion of peg 13 includes an axial recess 13a and the upper portion has two flanges 25 and 25a so that the peg in effect constitutes a piston or plunger slidable in sleeve 12.

The peg is movable from the raised position of FIG. 1 in which its lower end is clear of member 20 into a position fully within sleeve 21 by feeding pressure fluid into sleeve 12 through a conduit 1. The pressure fluid such as air under pressure acting upon flange 25a will move the peg downwardly into the position shown in FIG. 2 as it is readily apparent. The end or lower limit position of the peg is reached when flange 25 thereof engages a shoulder 26 in sleeve 12. Just before reaching this end position, flange 25 actuates a switch 27 biased to protrude into the path of flange 25. The effect of the actuation of this switch will be more fully explained hereinafter.

An axial recess 13a in peg 13 accommodates two control members in the form of two plungers 14 and 17. Each of these plungers has a cylindrical portion 14a and 17a respectively and a conical portion 14b and 17b respectively. The two conical portions face in opposite directions. A cover plate 24 covers recess 13a in peg 13.

A downward displacement of plunger 14 as seen in FIG. 2 presses bolts 15, crosswise slidable in the peg, against a preferably split or otherwise yieldable sleeve 16 which, in turn, is pressed against the adjacent wall portion of member 10 thus establishing a clamping connection between peg 13 and member 10. Similarly an upward displacement of plunger 17 as seen in FIG. 2 presses bolts 18 against a preferably split or otherwise yieldable sleeve 19 which, in turn, is pressed against the adjacent wall portion of members 20 thereby establishing a clamping connection between the peg and member 20. Several circumferentially, uniformly spaced bolts 15 and 18 may be provided.

Referring to FIG. 2, this figure shows peg 13 in its lowermost position into which it has been moved by the previously described action of the pressure fluid supplied through conduit 1. Neither one of the plungers 14 or 17 has been displaced as yet and one or several pins 22 which are crosswise or radially displaceable in the peg, are withdrawn into a circumferential groove 28 formed in plunger 17. In such a withdrawn position the pins are clear of a circumferential groove 23 formed in liner 21. As can best be seen in FIG. 2, the pins 22 and groove 23 are in radial alignment when the peg is in its aforedescribed lowermost position. Members 10 and 20 are not yet in pressure engagement or abutment as is indicated by the double lines between the two members.

To press the two members 10 and 20 against each other, that is to move the two members from the slightly spaced apart positions indicated in FIGS. 1, 2 and 3, by double lines between the two members into the abutting position indicated in FIG. 4 by a single line separating the two members, pressure fluid at a low pressure such as low pressure air is supplied through a conduit 2 including a reduction valve 32 (see FIG. 5). This valve is set so that the pressure of the air is just sufficient to lift the plunger 17 from the position of FIG. 2 in which pin 22 is withdrawn from groove 23 into the position of FIG. 3 in which the pin is in engagement with the groove. As it is evident, the lateral or radial outward displacement of pin 22 is effected by the respective one of the slanted surfaces of groove 28 with which the tapered or conical inner end of pin 25 coacts. The inner ends of bolts 18 are still clear of the conical surface 17b as is shown in FIG. 3. Peg 13 is now coupled to member 20 but the peg and member 20 are not clamped together as yet. Pressure fluid is now supplied to a conduit 3. This fluid acts upon flange 25 from below to cause lifting of peg 13 and with it member 20 to an extent such that this member is pressed against member 10 by the aforedescribed coupling action of pin 22. Finally, pressure fluid at normal or full pressure is supplied through conduit 2 by means of an auxiliary conduit 4 (see FIG. 5) by-passing valve 32 and also a conduit 5 acting upon plunger 14. As a result, plungers 14 and 17 are displaced in opposite directions, that is toward each other. Such displacement of the plungers will cause concial surfaces 14b and 17b to act upon bolts 15 and 18 which, in turn, will press sleeves 16 and 19 against the adjacent wall portions of members 10 and 20, thereby clamping together both members and the peg.

All the components are now in the positions of FIG. 4 in which members 10 and 20 are secured in fixed positions in reference to each other and also pressed against each other.

To release the two members, pressure fluid is supplied through a conduit 6. The action of such a supply of pressure fluid returns the plungers 14 and 17 into the positions of FIG. 2 in which the sleeves 16 and 19 are released from members 10 and 20 and pin 22 is in alignment with groove 28 in plunger 17. Pressure fluid is then again supplied to conduit 3 by means of auxiliary or by-pass conduit 7 (see FIG. 5). This fluid pressure acts upon flange 25 from below. The resulting withdrawal force applied to peg 13 causes pin 22, by engagement with the respective slanted surface in groove 28, to slide back into groove 28, that is into the position of FIG. 2 thereby freeing the peg for return into the fully withdrawn rest position of FIG. 1.

The aforedescribed control of the supply of pressure fluid to the conduits to effect the displacement of the peg and the plungers therein may be conveniently controlled by the manually operable multi-way valve shown in FIG. 5. Pressure fluid is supplied to the valve through an inlet conduit 31 which should be visualized as being connected to a suitable supply of pressure fluid. The valve is shown as having seven operational positions and an actuating handle 29 is shown by means of which the valve can be successively set for its operational positions. The handle is shown in a neutral position.

As it is apparent from the previous description, the coupling and clamping operations cannot be effected until the peg has been moved from the position of FIG. 1 into the position of FIG. 2, that is until the peg is fully inserted into the locking opening defined by lining 21. A premature feeding of pressure fluid to effect displacement of pin 22 and bolts 15 and 18 may result in damage to the device. To prevent such premature operation, switch 27 which, as previously described, is operated by flange 25 of peg 13, just before the peg reaches the position of FIG. 2, is connected by wire 30 to the multi-way valve in which it controls a conventional fail-safe means (not shown) which prevents the flow of pressure fluid from conduit 31 into conduit 2 until peg 13 has reached the position of FIG. 2, that is its fully inserted position in which coupling may be effected by the outward displacement of pin 22. Such locking means may be readily visualized as an electromagnetically operated safety means in the conduit 2 or 31 which is opened by switch 27 when the peg is in its inner end position.

Instead of providing a switch 27 for control of the aforedescribed safety means, a time relay can also be used or a diaphragm-operated valve which responds to an increase of the pressure in conduit 1 when flange 25 reaches engagement with shoulder 26.

The multi-way valve is connected with the conduit sockets provided on the device proper, preferably by means of suitable high pressure hoses, as are well known in the art.

The duct connections required to connect supply conduit 31 as previously described are in the valve and the control thereof by valve control members actuated by handle 29 should be visualized as being conventional. These duct connections do not constitute part of the invention and are hence not described or illustrated in detail. The turning of handle 29 from the illustrated neutral position through its entire cycle effects the aforedescribed sequence of coupling, clamping and release operations. A by-pass conduit 7 also indicated in FIG. 5 coacts with conduit 3 to increase the pressure therein in connection with the aforedescribed withdrawal of the peg.

FIG. 6 shows an automatic cycling device to effect the aforedescribed sequence of coupling, clamping and releasing operations in a fully automatic manner. The cycling drive may include a fail-safe means controlled by switch 27 and wires 30 as described in connection with FIG. 5. The cycling device is activated by moving an operating lever 33 from a neutral position 35 into the illustrated full line position. As a result a three-way valve 34 opens a path for a flow of pressure fluid from a supply line 36 through an also activated electromagnetic valve 37 of conventional design to conduit 1 for the purpose previously described. Peg 13 is now moved from the position of FIG. 1 into the position of FIG. 2 and switch 27 is operated as described. At the same time, electromagnetic valve 37 is set so that pressure fluid is fed through a diaphragm-operated change-over valve 38, a reduction valve 39 and a one-way valve 40 to conduit 2. As previously explained, plunger 17 is now slightly lifted to couple the peg to member 20. When the plunger reaches its lifted position, pressure in conduit 2 is increased by means of by-pass 4 as described thereby causing the diaphragm-operated valve 38 to change over, thereby connecting the flow of pressure fluid through a second diaphragm-controlled change-over valve 41 and a one-way valve 42 to conduit 3, thereby causing lifting of peg 13 to press members 10 and 20 into abutment as previously described. The resulting increase in the pressure of the pressure fluid activates valve 41 and pressure fluid is now fed through a second three-way valve 43 coupled with three-way valve 34 to conduit 5 and simultaneously to conduit 2 through a one-way valve 44, thereby clamping the peg to members 10 and 20 as previously described.

The coupling and clamping operations are now completed as it is apparent from the previous description.

To effect release of the peg, lever 33 is first moved into the position 35 thereby interrupting the flow of pressure fluid through valve 34. At the same time conduits 2, 3 and 5 are relieved through three-way valve 43 and a vent 45. Thereupon the lever is moved into the dotted line position 46 whereby pressure fluid is fed to conduit 6 through a diaphragm-controlled valve 47. As a result, plungers 14 and 17 are moved apart thereby freeing sleeves 16 and 19 as previously described. When the plungers reach the respective end positions, the pressure in conduit 6 increases, whereby valve 47 is switched over. The pressure fluid now flows through valve 48 to conduit 3 and by-pass 7, respectively, to effect withdrawal of the peg into the position of FIG. 1.

While the invention has been described in detail with respect to certain now preferred examples and embodiments of the invention, it will be understood by those skilled in the art after understanding the invention that various changes and modifications may be made without departing from the spirit and scope of the invention, and it is intended, threfore, to cover all such changes and modifications in the appended claims.

What is claimed as new and desired to be secured by Letters Patent is:

We claim:

1. A clamping device for releasably clamping two relatively movable members in predetermined positions in reference to each other and holding said members in pressure engagement, said device comprising a locking peg adapted to be guided lengthwise slidable in one of said members and to be received in a locking opening of the other member, a coupling means supported in said locking peg substantially crosswise slidable in reference thereto between a position within the peripheral outline of said peg and a position protruding therefrom, said coupling means in its protruding position being adapted to engage said other member for coupling said members, first actuating means coacting with said peg for displacing the same into and out of a position received by said other member, second actuating means supported by said peg lengthwise movable in reference thereto, said second actuating means coacting with said coupling means for moving the same into the position protruding from the peripheral outline of the peg and thereby into coupling engagement with said other member, third actuating means coacting with said peg for moving the same with said other member coupled thereto in reference to said one member into a direction for pressing the two members against each other, and clamping means supported in said peg substantially crosswise slidable in reference thereto between a clamping position engaging wall portions of both said members and a release position free of said wall portions, said second actuating means coacting with said clamping means also for selectively moving the same into either one of said positions.

2. A clamping device according to claim 1 and comprising a guide sleeve attachable to said other member within the locking opening thereof, said guide sleeve having in its inner peripheral wall a recess for receiving said clamping means in the protruding position thereof.

3. A clamping device according to claim 2 and further comprising a second guide sleeve attachable to said one member, said locking peg being slidably guided in said second sleeve.

4. A clamping device according to claim 1 wherein said device has an axial recess, the wall portions of the peg surrounding said recess including two lengthwise spaced transverse bores, and said clamping means comprise two bolts lengthwise displaceable in said bores, and wherein said second actuating means comprise two control members lengthwise slidable in said recess and each having an external conical wall portion engageable with the inner end of one of said bolts, said conical portions pushing said bolts outwardly upon displacement of said control members within said recess whereby the outer ends of said bolts exert a clamping pressure upon said members.

5. A clamping device according to claim 4 wherein a yieldable sleeve is interposed between the outer end of each bolt and an adjacent wall portion of the respective member, the outer ends of said bolts transmitting the outward pressure applied thereto upon said wall portions through said sleeves.

6. A clamping device according to claim 4 wherein said coupling means comprises at least one pin displaceable crosswise in a further bore through the wall portions of the peg surrounding the recess therein, and wherein one of said control members has a further external conical wall portion engageable with said pin to displace the same outwardly in response to a lengthwise displacement of said one control member in reference to the pin, said outward displacement moving the pin into engagement with said other member.

7. A clamping device according to claim 1 and comprising a cylindrical sleeve attachable to said one member, said peg being in the shape of a plunger slidable in said sleeve, and wherein said first actuating means comprise conduits connected to said cylindrical sleeve for feeding a pressure medium thereto to displace the plunger-shaped peg in either direction, said peg when in a predetermined aligned position in the locking opening permitting the coupling action and the release action respectively by said coupling means but blocking said actions in any other position.

8. A clamping device according to claim 7 wherein said peg includes an axial recess, and wherein said second actuating means comprise a control member displaceable within said recess of the peg, the lengthwise position of said control member in the recess controlling the position of said clamping means, and second conduit means for feeding a pressure medium into said recess to control the position of the control member therein to effect respectively clamping and release of the two members by the clamping means.

9. A clamping device according to claim 8 and comprising a multi-way valve means included in said conduit means of the first and second actuating means, said valve means comprising operating means for sequentially connecting said pressure fluid conduits to said cylinder sleeve and to said recess to effect movement of the peg into said locking opening, coupling action by said coupling means, clamping action by said clamping means, release of the clamping means, release of the coupling means and withdrawal of the peg from the locking opening when the valve means is sequentially set into each of its positions.

10. A clamping device according to claim 9 and comprising safety means connected with said valve means, said safety means blocking activation of the coupling means for coupling action until the peg is fully inserted into said locking opening in the other member.

11. A clamping device according to claim 8 and comprising a three-way valve means with one rest position and two working positions included in said conduits connected to the first and the second actuating means, said valve means in its rest position connecting all said conduits for discharge of pressure fluid therefrom, and in one of its working positions sequentially connecting the conduits to operate the first actuating means for moving the peg into its locking position, a magnetically operated valve means controlled by said three-way valve means and controlling the conduits of the second actuating means to actuate the coupling means for coupling action upon the peg reaching an end position in said locking opening, a first change-over valve means controlled by said three-way valve means and controlling the conduits of the first actuating means to effect partial withdrawal of the peg thereby pressing said two members together, a second change-over valve means controlled by said three-way valve means and controlling the conduits of the second actuating means to actuate the control member thereof for moving the clamping means into the clamping position, and a third change-over valve means controlled by said three-way valve means in the second working position thereof and controlling said conduits of the second actuating means to actuate said control member for release of the clamping means and the coupling means and the conduits of the first actuating means to actuate the same for withdrawal of the released peg from the locking opening.

No references cited.

CARL W. TOMLIN, *Primary Examiner.*

RICHARD W. COOKE, JR., *Examiner.*

R. S. BRITTS, *Assistant Examiner.*